United States Patent Office 2,729,664
Patented Jan. 3, 1956

2,729,664
HYDROCARBON SYNTHESIS CATALYST

Isidor Kirshenbaum, Union, N. J., assignor to Esso Research and Engineering Company, a corporation of Delaware No Drawing. Continuation of application Serial No. 792,851, December 19, 1947. This application August 2, 1951, Serial No. 240,031

1 Claim. (Cl. 260—449.6)

This application is a continuation of application Serial No. 792,851, filed December 19, 1947, now abandoned, for Hydrocarbon Synthesis.

The present invention relates to catalytic conversions and improved catalysts therefor. More particularly, the invention is concerned with improved iron-type catalysts for the catalytic synthesis of normally liquid hydrocarbons and oxygenated compounds from CO and $H_2$.

Iron-type catalysts are normally employed in the synthesis of hydrocarbons at relatively high temperatures of about 450°–800° F. and relatively high pressures of about 3–100 atmospheres abs. or higher, to obtain predominantly unsaturated and oxygenated products from which motor fuels with high octane ratings may be recovered.

The extreme temperature sensivity and relatively rapid catalysts deactivation of the hydrocarbon synthesis have led, in recent years, to various attempts and proposals to employ the so-called fluid catalyst technique wherein the synthesis gas is contacted with a dense turbulent bed of finely divided catalysts fluidized by the gaseous reactants and products. This technique permits catalyst replacement without interruption of the process and greatly improved temperature control. However, the adaptation of the hydrocarbon synthesis to the fluid catalyst technique has encountered serious difficulties, particularly when iron-type catalysts are used.

Application of the fluid technique requires ease of fluidization and attrition resistance in addition to the conventional characteristics determining catalyst activity, such as total desired yield and active catalyst life. It is also desirable that the catalyst be active in the temperature range above 600° F. and still be highly selective to $C_4+$ hydrocarbons, since under these conditions high octane motor fuels are obtained. None of the prior art iron-type catalysts complies satisfactorily with all of these requirements.

Iron catalysts are usually prepared by the reduction of various natural or synthetic iron oxides or by the decomposition of iron carbonyls, the catalytic activity being enhanced by the addition of such promoters as various compounds of alkali metals or the oxides of chromium, zinc, aluminum, magnesium, manganese, the rare earth metals and others in small amounts of about 1–10%. While, some of these catalysts exhibit excellent activity characteristics they are usually deficient with respect to ease of fluidization, and/or attrition resistance, particularly when used in commercial runs of several hundred hours' duration. Even most fluidized catalysts obtained from sintered iron, which have been found to exhibit excellent fluidization and attrition characteristics, show signs of disintegration in long run operation.

This general lack of mechanical resistance or steady decrease of mechanical strength during operation has been found to be closely connected to a high rate of carbon deposition on the catalyst, encountered at the conditions required by the synthesis using iron catalysts. The catalyst disintegration which accompanies excessive carbon deposition is believed to be the result of an attempted migration of carbon into the iron lattice by the mechanism of interstitial carbide formation followed by disintegration of the carbide to free carbon. This process may continue until the catalyst mass contains about 99% of carbon.

It will be appreciated from the above that iron-type catalysts of satisfactory synthesizing activity, selectivity, and catalyst life, which may be used in commercial operation without substantial catalyst disintegration and carbon deposition, are a need strongly felt in the synthesis art. Many attempts have been made to improve the disintegration resistance of this type of catalyst by varying the methods of preparation and/or the character and proportions of addition agents. While these attempts have led, in isolated cases, to certain improvements these were the result of hit and miss experimentation. Prior to the present invention, no generally applicable rules or means had been found which would permit to predict and prepare, with any measure of certainty, from a wide variety of starting materials and largely independent of the method of preparation used, a low-carbonizing, highly disintegration-resistant iron-type catalyst having satisfactory catalytic properties. The present invention fills this serious gap in the hydrocarbon synthesis art.

It is, therefore, the principal object of the present invention to provide improved iron-type catalysts for the catalytic synthesis of hydrocarbons from CO and $H_2$.

It is a further object of this invention to improve the hydrocarbon synthesis process by making available a wide variety of iron-type catalysts of satisfactory activity and selectivity having desirable disintegration and carbon forming tendencies.

A more specific object of the invention is to improve the hydrocarbon synthesis process employing the fluid catalyst technique by making available a wide variety of iron-type catalysts of satisfactory activity and selectivity having low disintegration and carbon forming tendencies.

A still further object of the invention is to provide a new method by which iron-type synthesis catalysts having low carbon forming and disintegration tendencies may be selected with a high measure of certainty.

Other and further objects and advantages of the invention will appear hereinafter.

In accordance with the present invention, the carbon forming and disintegration tendencies of iron-type hydrocarbon synthesis catalysts may be controlled, quite generally, by combining the catalyst components so as to form a composite which will either prevent or permit substantial diffusion of carbide bonds, i. e. Fe-C bonds, from the surface into the lattice of the body of the catalyst, depending on the degree of catalyst carbonization and disintegration desired. When catalysts of low carbonization and disintegration resistance are desired, the catalyst components should be combined to form composites which will substantially prevent such diffusion of carbide bonds, while composites permitting such diffusion to a substantial degree represent strongly coking and readily disintegrating synthesis catalysts.

It has been found that the diffusion of carbide bonds into the lattice of the catalyst body and with it the carbon forming tendencies of iron-type catalysts may be controlled in three different ways, namely by:

(A) Combining the iron base with a promoter having a certain well defined crystal structure;

(B) Combining iron having a certain well defined crystal structure with the other catalyst components;

(C) Combining iron with other elements to form alloys or intermetallic compounds which prevent diffusion of carbide bonds into the catalyst lattice.

These three embodiments of the invention and their proper application will be best understood from the more detailed description hereinafter.

The carbon-forming tendency of a catalyst may be expressed as carbon selectivity, i. e. the mols of carbon monoxide converted to carbon on the catalyst (exclusive of wax) per 100 mols of CO converted in the hydrocarbon synthesis. The carbon combined as an iron carbide is also included in this definition. Since the catalyst age, defined in terms of cubic feed of CO converted per pound of catalyst, has a marked effect on carbon selectivity, the carbon selectivities are directly comparable only at the same catalyst age. As a first approximation, this may be done by expressing the carbon-forming tendencies of a catalyst as a percentage of the carbon selectivity of a reference catalyst at the same age. This procedure is followed in the following description wherein all carbon data are expressed as "carbon selectivity, percent of reference."

The carbon-forming tendency of a catalyst depends in part upon such operating variables as partial pressure of hydrogen, conversion level, etc. It is necessary, therefore, in comparing the effect of promoters, crystal structure, etc. upon carbon-forming tendencies of catalysts, to use comparable test conditions for all catalysts. This fact has been taken into consideration in the tabulation of data given below.

(A) COMBINING THE IRON BASE WITH A PROMOTER OF A CERTAIN WELL DEFINED CRYSTAL STRUCTURE

Catalysts with very high carbon-forming tendencies (carbon selectivity, percent of reference, greater than about 70% under the experimental conditions described below) may be made by combining iron with a non-oxide promoter having a face-centered type of cubic crystal lattice with a lattice constant smaller than about 5.55 A°. Examples of promoters that may be used are: KF, LiBr, LiCl, LiF, NaF, etc. The quantitative relationship between carbon selectivity and lattice constant is shown in the specific examples given below. Belonging to this group of high carbon formers are also such compounds as AgCl, AgF, etc. In addition, this group contains promoters of the type $CaF_2$, etc.

Catalysts with high carbon-forming tendencies may also be made by combining iron with an oxide promoter having a face-centered type of cubic crystal lattice with a lattice constant smaller than about 5.0 A°. Examples of promoters that may be used are: CaO, CdO, MgO, MnO, etc. Belonging to this group are also such promoters as CoO, NiO, TiO. In addition, such promoters as $Li_2O$, etc., belong to this group.

Catalysts with low carbon-forming tendencies (carbon selectivity, percent of reference, less than about 50% under the experimental conditions described below) may be made by combining iron with a promoter having a face-centered type of cubic crystal lattice with a lattice constant larger than about 5.8 A°. Examples of this type of promoters are: KBr, CsF, KCl, KF, LiI, RbBr, RbCl, RbI, and others. This group also contains promoters of the type $SrCl_2$, KCN, etc.

Among the face-centered type promoters is a number of materials having lattice constants between about 5.6 and 5.8. This group includes NaCl, RbF, etc. Catalysts made with these promoters show intermediate carbon-forming tendencies. In certain instances low carbon-forming tendencies may be obtained, but the catalysts are quite sensitive to operating conditions and moderate changes may increase carbon formation to a high value.

Catalysts with low carbon-forming tendencies may be made by combining iron with a promoter having a body-centered type of cubic crystal lattice. Examples of such promoters are: CsBr, CsI, and others. For the same purpose, iron may be combined with a promoter support having an hexagonal or triclinic type of crystal lattice. Examples of promoters falling into this group are: ZnO, BeO, $Al_2O_3$, $Ti_2O_3$, CuO, and others. Also combination of iron with a promoter having an aragonite or scheelite type of crystal lattice leads to catalysts with low carbon-forming tendencies. Examples of promoters of this type are: $BaCO_3$, $SrCO_3$, $BaMoO_4$, $BaWO_4$, etc.

(B) COMBINING IRON HAVING A CERTAIN WELL DEFINED CRYSTAL STRUCTURE WITH THE OTHER CATALYST COMPONENTS

Catalysts with relatively high carbon-forming tendencies may be made by combining suitable catalyst addition agents with iron compounds which, upon reduction, will give iron with a surface at least a portion of which has a face-centered lattice structure. Examples of iron compounds of this type are: FeO and $Fe_3O_4$, gamma $Fe_2O_3$ also falls into this category.

Catalysts with low carbon-forming tendencies may be made by combining suitable catalyst additions with iron compounds which, upon reduction, will give iron having an exclusively body-centered crystal lattice. Examples of iron compounds falling into this group are: Alpha-$Fe_2O_3$ (Williams red iron oxide, Hanna hematite, specular hematite), iron carbonyl, and others.

Catalysts with low carbon-forming tendencies may also be made by alloying with iron materials which, upon reduction, form body-centered lattice structures with iron. Examples of such alloying materials are: chromium, columbium, molybdenum, uranium, vanadium, tungsten (alpha form). Catalysts with low carbon-forming tendencies may also be obtained by combining iron with supports having hexagonal, aragonite, scheelite, etc. crystal structures. Examples of such supports are: $Al_2O_3$, $BaCO_3$, $SrCO_3$, etc.

Alloying iron with materials which form with iron intermetallic compounds having a cubic body-centered structure will likewise lead to catalysts with low carbon-forming tendencies. Examples of metals which form such compounds with iron are: Aluminum, silicon, zinc, etc.

(C) COMBINING IRON WITH OTHER ELEMENTS TO FORM ALLOYS AND INTERMETALLIC COMPOUNDS WHICH PREVENT DIFFUSION OF THE CARBON BONDS INTO THE CATALYST

Catalysts falling within this broad class of materials have low carbon-forming tendencies. Examples of elements forming with iron compounds of the type specified are those which are capable of forming intermetallic compounds having a cubic body-centered crystal structure or any other structure preventing the formation or diffusion of carbon bonds, such as silicon, aluminum, zinc, etc. Chromium, vanadium, and other alloying elements which affect the stability of the carbide and the rate of diffusion of the carbon into the lattice are likewise suitable for this purpose.

Combinations of the methods described under A, B and C may be employed. For example, Fe-Cr-Si alloys, doubly promoted composites, such as $ZnO-Fe_2O_3-K_2CO_3$, $CuO-Fe_2O_3-Al_2O_3$, etc. yield active catalysts having low carbon-forming tendencies.

While the present invention is not to be limited to any specific theory or reaction mechanism and the reasons underlying the influence of the crystal structures and composites described above on carbide bond diffusion and carbon formation are not yet fully understood, the phenomena observed by the inventor may be reasonably well explained as follows.

One of the primary steps in the formation of carbon on an iron-type synthesis catalyst is believed to be the formation of Fe-C bonds on the surface of the catalyst. This may occur by reaction of carbon monoxide with the surface, probably after the chemisorption of CO by the surface. These Fe-C bonds eventually result in the formation of iron carbide (considered here as $Fe_2C$). The formation of the carbide bonds occurs with difficulty on a body-centered iron, i. e. the iron crystal structure stable at room temperature. However, the carbide may form readily from face-centered iron, i. e. the form that is normally stable above 1335° F. Upon reduction of a catalyst, such as $Fe_2O_3$ in the form of Williams red oxide or Hanna hematite, a body-centered iron is formed on the surface of this catalyst. Consequently, the iron carbide bonds form with difficulty under synthesis conditions. The carbide bonds that do form, do so probably by either causing local changes in the structure of the catalyst, or by forming slowly at such "activated" centers as incompleted lattices, points of discontinuity in lattices, such as impurities on the surface, points of strain, etc. But whatever the cause of the slow formation of Fe-C bonds, a high concentration of carbide (Fe-C bonds) does not build up rapidly and consequently diffusion of the carbide bonds into the lattice is slow. This results in a low rate of carbon formation as will appear more clearly hereinafter.

When considering a crystal bounded by a surface, the distribution of the atoms or ions in the main body of the crystal far from the surface is not influenced by the presence of the surface and may be considered as being described adequately by the data obtainable by X-ray and other similar methods of study. The distribution of the atoms near the surface can, however, be different from the internal atomic distribution. The type of difference depends upon the kind of crystal, the orientation of the surface in respect to the planes of the crystal, and the kinds of adsorbed atoms or ions. In the case of pure red iron oxide, few, if any, atoms or ions are adsorbed on the surface and, except for lattice imperfections and strains, the structure of the surface is not too different from that of the bulk of the catalyst. If, on the other hand, a promoter Fe-C bond or perhaps of the iron carbide itself takes place.

However, as has just been stated, the crystal structure of the body of the catalyst is not affected by the structure of the surface. The carbide carbon consequently has to force its way into the body of the crystalline catalyst. This diffusion into the crystal lattice may cause lattice changes to take place. This in turn can cause cleavage of the crystal along its various lines of cleavage, including those along crystalline interfaces. On the other hand, since there is little, if any, CO in the body of the crystal, the carbide is thermodynamically unstable and decomposes to form iron and carbon. This decomposition of the carbide causes an expansion to take place, with a consequent rupture of the lattice. Thus, a face-centered promoter results in a high rate of Fe-C bond formation, resulting in rapid diffusion of the carbide carbon into the lattice, which, in turn, results in the rupture of the lattice, catalyst disintegration and coke deposition.

The catalysts of the present invention may be prepared by combining the proper catalyst components by any suitable method of coprecipitation, precipitation of the iron component on a suitable precipitated support, impregnation or mechanical mixing, known per se in the art of catalyst manufacture, followed by reduction.

The invention will be further illustrated by the following specific examples.

*Example 1*

The effect of the lattice constant of face-centered promoters or supports on the carbon-forming tendencies of iron type catalyst is demonstrated by the experimental data tabulated below.

TABLE I.—EFFECT OF LATTICE CONSTANT OF FACE-CENTERED TYPE PROMOTOR OR SUPPORT

SMALL

| Catalyst | Promoter or Support | Crystal Structure of Promoter or Support | Lattice Constant (A°) | Temp., ° F. | | Percent Conv. | $C_4+$, cc./m.³ Cons. | Carbon Sel., Percent of Ref. |
|---|---|---|---|---|---|---|---|---|
| | | | | Red. | Syn. | | | |
| $MgO.Fe_2O_3$ | MgO | $O_h^5$ | 4.20 | 900 | 550 | 96 | 165 | 95 |
| $MnO.Fe_2O_3$ | MnO | $O_h^5$ | 4.44 | 900 | 563 | 94 | 155 | 85 |
| $Li_2O.Fe_2O_3$ | $Li_2O$ | $O_h^5$ | 4.61 | 900 | 650 | 90 | 100 | 80 |
| $Fe_2O_3+1\%$ KF | KF | $O_h^5$ | 5.33 | 1,000 | 600 | 94 | 203 | 95 |

LARGE

| | | | | | | | | |
|---|---|---|---|---|---|---|---|---|
| $Fe_2O+1\%$ CsF | CsF | $O_h^5$ | 6.01 | 900 | 610 | 97 | 209 | 27 |
| $Fe_2O_3+1\%$ KCl | KCl | $O_h^5$ | 6.28 | 900 | 570 | 98 | 183 | 39 |
| $Fe_2O_3+1.7\%$ KBr | KBr | $O_h^5$ | 6.58 | 900 | 580 | 98 | 176 | 47 |
| $Fe_2O_3+1.0\%$ KBr | KBr | $O_h^5$ | 6.58 | 900 | 560 | 97 | --------- | 22 |
| $Fe_2O_3+2.4\%$ KI | KI | $O_h^5$ | 7.05 | 900 | 555 | 97 | 209 | 45 |

The space-group symbols such as $O_h^5$ (for a face-centered cubic crystal) are discussed in detail in such standard texts as Wycoff, "The Structure of Crystals"; Bragg, "Atomic Structure of Minerals"; and Davey, "Study of Crystal Structures and its Applications."

is present on the surface during reduction, the orientation of the iron atoms on or near the surface, formed in the vicinity of the promoter, will be affected by the crystal structure of the promoter. Thus, the presence of a face-centered cubic promoter (such as KF) provides an atomic or molecular configuration of the surface favorable for a "face-centered iron" in the vicinity of the promoter. This increases the number of "active" centers at which Fe-C bonds can form easily. Thus, local high concentrations of carbide are formed and rapid diffusion of the The above data show that although CsF and KF have very similar chemical properties and would be expected, from an examination of the periodic table, to act in a similar manner, the CsF with a lattice constant of 6.0 A° is a very much lower carbon former than KF with a lattice constant of 5.3 A°. As is shown by the following data, the KF and CsF promoted catalysts have similar initial activity and selectivity in the hydrocarbon synthesis reaction per se but differ very significantly in carbon-forming tendencies.

TABLE II.—EFFECT OF LATTICE CONSTANT

| Promoter on Red Iron Oxide ($Fe_2O_3$) | CsF | KF |
|---|---|---|
| Lattice Constant of Promoter (A°) | 6.0 | 5.3 |
| Temperature (° F.) | 610 | 580 |
| $C_4+$ Yield (cc./m.³ cons.) | 209 | 190 |
| "Alcohol" Yield (cc./m.³ cons.) | 12 | 17 |
| Cat. Age (CF CO conv./# cat.) | 155 | 211 |
| C Sel. (Percent of Ref.) | 27 | 106 |

*Example II*

The effect of the type of iron compound used for reduction on the carbon-forming tendencies of iron-type catalysts is illustrated by the data given in Table III below.

TABLE III.—EFFECT OF IRON COMPOUND USED FOR REDUCTION

| Compound | Crystal Structure | Temp. Red. ° F. | Syn. | Percent Conv. | $C_4+$, cc./m.³ H+CO Cons. | Carbon Selectivity, Percent of Ref. |
|---|---|---|---|---|---|---|
| α $Fe_2O_3$ Williams Red Oxide | Hexagonal | 900 | 560 | 96 | 125 | 4 |
| Hanna Hematite | do | 900 | 590 | 96 | 132 | 4 |
| $Fe_3O_4$ | $Fe_3O_4$ = cubic, FeO = face-centered cubic. | 900 | 580 | 97 | 121 | 41 |

It may be seen that catalysts obtained from iron having the crystal structure prescribed by the present invention have extremely low carbon-forming tendencies.

*Example III*

The following table illustrates the effect of alloys and intermetallic compounds preventing carbide bond diffusion into the catalyst body.

TABLE IV.—EFFECT OF ALLOYS AND INTERMETALLIC COMPOUNDS

| Catalyst | Added Element | Temp., ° F., Syn. | Percent Conv. | $C_4+$, cc./m.³ $H_2$+CO Cons. | Carbon Selectivity, Percent of Ref. |
|---|---|---|---|---|---|
| 52Fe–48Si | Silicon | 650 | 97 | 183 | 2 |
| xFe–y Cr | Chromium | 650 | 87–93 | 146–166 | 18 |

The above data show that substantially no carbon is formed on catalysts of this type.

*Example IV*

The effects of promoters or supports having a nonface-centered cubic structure on the carbon-forming tendencies of iron type synthesis catalysts are summarized below in Table V. The crystal structure of these promoters or supports is given in Table VI.

TABLE V.—EFFECT OF PROMOTERS AND SUPPORTS WITH A NONFACE-CENTERED CUBIC STRUCTURE

| Catalyst | Promoter or Support | Temp., ° F. Red. | Temp., ° F. Syn. | Percent Conv. | $C_4+$, cc./m³ | Carbon Selectivity, Percent of Ref. |
|---|---|---|---|---|---|---|
| $80BaCO_3$–$20FeCO_3$ | $BaCO_3$ | 900 | 630–650 | 96 | 211 | 32 |
| $80CaCO_3$–$20FeCO_3$ | $CaCO_3$ | 900 | 650 | 96 | 205 | 16 |
| $ZnO.Fe_2O_3$ | ZnO | 900 | 560 | 95 | 157 | 8 |
| $80ZnO$–$20Fe_2O_3$ | ZnO | 900 | 575–650 | 94–6 | 148 | 10 |
| 99 ($ZnO$–$20Fe_2O_3$)+$1K_2CO_3$ | ZnO, $K_2CO_3$ | 900 | 620–650 | 95 | 200 | 28 |
| $FeO.Al_2O_3$ | $Al_2O_3$ | 900 | 612 | 99 | 166 | 16 |
| $BeO.Fe_2O_3$ | BeO | 900 | 560 | 91 | 179 | 33 |
| $99Fe_2O_3$+$1K_2CO_3$ | $K_2CO_3$ | 900 | 615 | 95 | 210 | 28 |
| $CuO(Fe, Al)_2O_3$ | CuO+$Al_2O_3$ | 900 | 555 | 94 | 129 | 3 |
| (Cu, Zn)O.$Fe_2O_3$ | CuO+ZnO | 900 | 650 | 98 | 120 | 12 |
| $CuO.Fe_2O_3$ | CuO | 900 | 530 | 94 | 190 | 20 |
| $50SiO_2$+$50Fe_2O_3$ | $SiO_2$ | 900 | 550 | 93 | 175 | 30 |
| $99Fe_2O_3$+$1CsBr$ | CsBr | 900 | 600 | 95 | 168 | 45 |

TABLE VI.—CRYSTAL STRUCTURE OF VARIOUS PROMOTERS OR SUPPORTS

| Promoter or Support | Crystal Structure or System | Space Group | Remarks |
|---|---|---|---|
| $BaCO_3$ | Rhombic | $V_h^{16}$ | |
| $CaCO_3$: | | | |
| (Aragonite) | do | $V_h^{16}$ | |
| (Calcite) | Rhombohedral | $D_{3d}^6$ | |
| ZnO | hexagonal | $C_{6v}^4$ | |
| BeO | do | $C_{6v}^4$ | |
| CuO | monoclinic | | |
| $Al_2O_3$: | | | |
| (α) | hexagonal | $C_{6v}^4$ | |
| (γ) | cubic | $O_h^7$ | |
| $SiO_2$ | do | $O_h^7$ | Other forms of $SiO_2$ have hexagonal and rhombic forms. |
| CsBr | do | $O_h^1$ | |
| $K_2CO_3$ | Similar to $Li_2CO_3$ which is monoclinic. | | Ref.: Gmelins Handbuch der Anorganischen Chemie System, Nos. 20 and 22. |

It will be seen that the presence of a nonface-centered type cubic crystal structure quite generally depresses carbon formation to a fraction of the carbon selectivity of the reference catalyst.

Typical methods of preparing and testing (in fixed bed operation) representatives of the various classes of catalysts selected and combined in accordance with the present example are given below.

Example V (1) Face-centered promoter with large lattice constant:

$Fe_2O_3 + 1\%\ CsF$ 495 gms. of $Fe_2O_3$ were mixed with an aqueous solution containing 5 gms. CsF to form a thick paste. After drying and then calcining for 3 hours at 850° F., the catalyst was reduced at 900° F. with 1 atmosphere of $H_2$ at 1000 v./v./hr. before testing with a synthesis gas having a feed ratio of $H_2/CO=1$, at 250 p. s. i. g. pressure and 200 v./v./hr. throughput.

| | |
|---|---|
| Synthesis temperature, ° F | 610 |
| CO conversion, percent | 97 |
| $C_4+$ yield (cc./m.³ feed consumed) | 209 |
| Catalyst age (cu. ft. CO converted/lb. of catalyst) | 155 |
| Carbon selectivity (percent of reference) | 27 |

(2) Hexagonal and triclinic composites (A) $BeO \cdot Fe_2O_3$ 71.9 gms. of BeO were added to a solution containing 203 cc. of concentrated $HNO_3$ in 500 cc. of distilled water. To this mixture was added a solution containing 1313 gms. of ferric nitrate in 3 liters of water. The final solution was made up with distilled water to 6 liters. This solution was added simultaneously with a solution containing 533 gms. of NaOH in 6 liters of water to a crock containing 6 liters of water. The pH was maintained at 9. The precipitate was filtered, washed, reslurried, refiltered and rewashed. After drying and then calcining for 3 hours at 1600° F., the catalyst was reduced and tested as described above.

| | |
|---|---|
| Synthesis temperature, ° F | 560 |
| CO conversion, percent | 91 |
| $C_4+$ yield (cc./m.³ feed consumed) | 179 |
| Carbon selectivity (percent of reference) | 33 |

(B) $80\ ZnO - 20\ Fe_2O_3$

A solution of 1016 gms. of $Fe(NO_3)_3 \cdot 9H_2O$ in 2 liters of water was added very slowly to a slurry of 1106 gms. of ZnO in 3 liters of water. The mixture was stirred until all of the iron had been precipitated. After filtering, washing, reslurrying, refiltering and rewashing, the precipitate was dried at 250° F. and then calcined for 3 hours at 850° F.

The catalyst was reduced at 900° F. with $H_2$ at 1 atm. pressure and 1000 v./v.hr. and then tested with a feed gas having a ratio of $H_2/CO=1$ at 250 p. s. i. g. pressure and 200 v./v./hr.

| | |
|---|---|
| Synthesis temperature, ° F | 575–650 |
| CO conversion, percent | 95 |
| $C_4+$ yield (cc./m.³ feed consumed) | 148 |
| Carbon selectivity (percent of reference) | 10 |

The effect of $K_2CO_3$ promoter on this supported catalyst may be seen from the following data:

(C) $99(80ZnO - 20Fe_2O_3) + 1K_2CO_3$

Half of the above washed filter cake was mixed in a paste with 5 gms. of $K_2CO_3$. The catalyst was dried and then calcined at 850° F. for 3 hours. After reduction at 900° F. with $H_2$ at 1 atm. pressure and 1000 v./v./hr., the catalyst was tested with a feed gas having a ratio of $H_2/CO=1$ at 250 p. s. i. g. pressure and 200 v./v./hr.

| | |
|---|---|
| Synthesis temperature, ° F | 620–650 |
| CO conversion percent | 95 |
| $C_4+$yield (cc./m.³ feed consumed) | 200 |
| Carbon selectivity (percent of reference) | 28 |

(3) Aragonite or scheelite type composites $80BaCO_3 - 20FeCO_3$

A solution of 344 gms. of $FeCl_2 \cdot 4H_2O$ in 2 liters of water was added slowly to a slurry of 1141 gms. of $BaCO_3$ in 3 liters of water. Contact with air was kept at a minimum during these steps. After stirring for 1 hour, an additional 149 gms. of ferrous chloride, dissolved in 600 cc. of water were added, and then, while stirring 285 gms. of ammonium carbonate, dissolved in 1 liter of water, were added. The mixture was stirred for 1 hour, the precipitate was then permitted to settle and was washed free of chloride ion by decantation. The precipitate was dried at 250° F. in a stream of $CO_2$.

The catalyst was reduced at 900° F. with 1 atm. $H_2$ at 1000 v./v./hr. and then tested with a feed gas having a ratio of $H_2/CO=1$ at 250 p. s. i. g. pressure and 200 v./v./hr.

| | |
|---|---|
| Synthesis temperature, ° F | 630–650 |
| CO conversion, percent | 96 |
| $C_4+$yield (cc./m.³ feed consumed) | 211 |
| Catalyst age (cu. ft. CO converted per lb. of catalyst) | 69 |
| Carbon selectivity (percent of reference) | 32 |
| Percent $CO_3=$ after use | [1]~22 |
| Theoretical for $BaCO_3$ | [1]~27 |

[1] Agreement within experimental error.

While the above experimental data were obtained in fixed bed operation, the relative comparisons hold for fluid operation, even though the higher gas throughputs, high recycle ratios and high catalyst turbulence typical for fluid operation, quite generally, cause a slight decrease of conversion and liquid product yields and an appreciable increase of carbon formation and catalyst disintegration. It follows that the catalysts of the invention, as a result of their greatly reduced carbonization and disintegration tendency and their superior liquid product selectivities even at high temperatures coupled with long catalyst life, are particularly useful for fluid catalyst operation and in this respect greatly superior to other catalysts of the iron type. Catalysts, in accordance with the invention, suitable for fluid operation may be prepared substantially as outlined in the above examples and sized to particle sizes of about 20–150 microns, preferably 50–100 microns. The conditions of fluid synthesis operation are well known in the art and need not be specified here in any great detail for a proper understanding of the invention by those skilled in the art. Briefly, these conditions may include catalyst particle sizes of 5–200 microns, superficial linear gas velocities of about 0.1–3 ft./sec., bed densities of about 10–120 lbs. per cu. ft., $H_2$:CO ratios of about 0.5–3, gas recycle ratios of about 0–5, temperatures of about 550°–750° F., and pressures of about 150–650 lbs. per sq. in.

While the foregoing description and exemplary operations have served to illustrate specific applications and results of the invention, other modifications obvious to those skilled in the art are within the scope of the invention. Only such limitations should be imposed on the invention as are indicated in the appended claims.

What is claimed is:

A method of synthesizing normally liquid hydrocarbons and oxygenated hydrocarbons by a reaction between carbon monoxide and hydrogen which comprises contacting the said carbon monoxide and hydrogen at synthesis conditions of temperature, pressure and contact time with a bed of fluidized catalyst consisting essentially of a reduced alpha ferric oxide catalyst associated with approximately 1 weight per cent of caesium fluoride, based on the total weight of the catalyst, and recovering from the reaction a product containing normally liquid hydrocarbons and oxygenated hydrocarbons.

References Cited in the file of this patent

UNITED STATES PATENTS

| | | |
|---|---|---|
| 2,365,094 | Michael et al. | Dec. 12, 1944 |
| 2,414,585 | Eggertsen et al. | Jan. 21, 1947 |
| 2,449,071 | Hawk et al. | Sept. 14, 1948 |
| 2,525,080 | Schiller | Oct. 10, 1950 |
| 2,552,347 | Segura | May 8, 1951 |

FOREIGN PATENTS

| | | |
|---|---|---|
| 300,294 | Great Britain | Nov. 7, 1928 |